No. 890,268. PATENTED JUNE 9, 1908.
H. ERICKSON.
IMPLEMENT FOR FORMING TRENCHES AND ROLLING SOIL.
APPLICATION FILED NOV. 16, 1907.
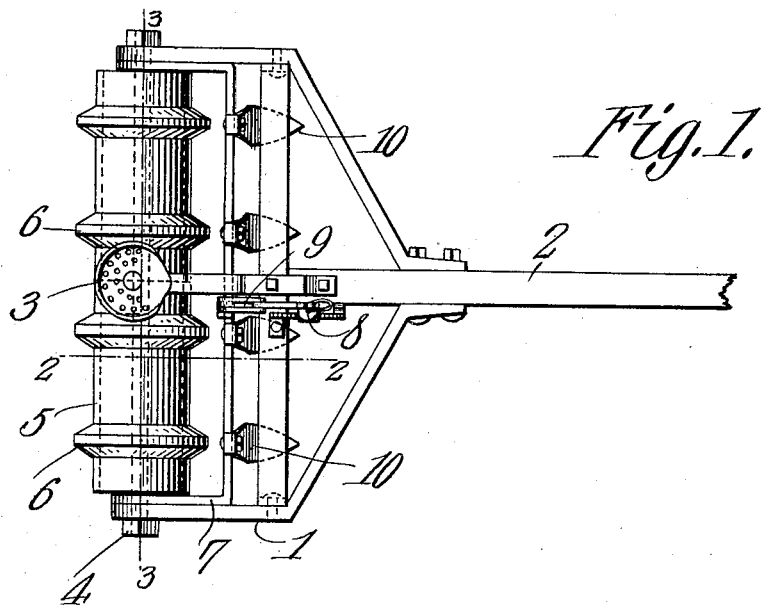
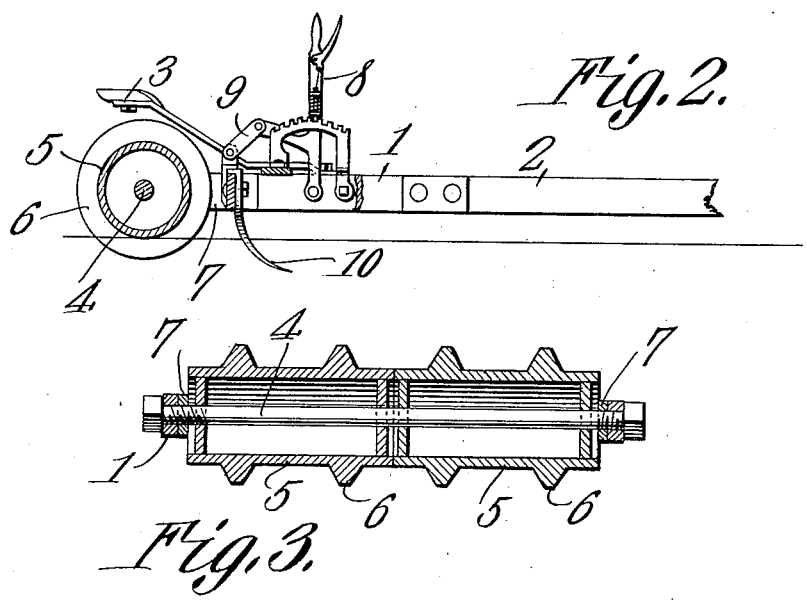
Inventor
Hans Erickson.
Witnesses

UNITED STATES PATENT OFFICE.

HANS ERICKSON, OF BRIDGER, WYOMING.

IMPLEMENT FOR FORMING TRENCHES AND ROLLING SOIL.

No. 890,268.　　　Specification of Letters Patent.　　　Patented June 9, 1908.

Application filed November 16, 1907. Serial No. 402,549.

*To all whom it may concern:*

Be it known that I, HANS ERICKSON, a citizen of the United States, residing at Bridger, in the county of Uinta and State of Wyoming, have invented a new and useful Implement for Forming Trenches and Rolling Soil, of which the following is a specification.

This invention has relation to implements for forming trenches and rolling soil and it consists in the novel construction and arrangements of its parts as hereinafter shown and described.

The object of the invention is to provide an implement especially adapted to lay off and form a series of irrigation ditches and at the same time to smooth the surface of the soil within and about the same.

The implement consists of a frame carrying a journaled shaft upon which is journaled a series of rollers having peripheral flanges spaced apart at suitable intervals and which are V-shaped in transverse section. A yoke is journaled to the said shaft beyond the outer ends of the said rollers and said yoke is provided with plow shovels which are located immediately in advance of the flanges of the rollers, a lever mechanism is mounted upon the frame and is operatively connected by means of a link with the yoke. The parts are so disposed that the yoke may be elevated so that the shovels carried thereby will be out of contact with the surface of the ground or the yoke may be lowered so that the said shovels will be brought in contact with the ground and held against the same by the weight of the yoke which is free to rise and fall within a limited degree while the said lever mechanism remains in a stationary position.

Figure 1 is a top plan view of the implement. Fig. 2 is a longitudinal sectional view of the same, and Fig. 3 is a longitudinal sectional view of the rollers carried by the implement.

The implement consists of the frame 1 to which is attached the tongue 2 and upon which is mounted the operator's seat 3. The shaft 4 is journaled in the rear portion of the frame and the roller sections 5 are journaled upon the shaft 4. The roller sections 5 are provided at suitable intervals with the peripheral flanges 6 which are V-shaped in transverse section. The yoke 7 is pivoted at its ends to the shaft 4 beyond the outer ends of the roller sections 5. The intermediate portion of the said yoke 7 lies in front of the roller sections 5. The lever mechanism 8 is mounted upon the frame 1 and is connected by means of the link or links 9 with the yoke 7. The shovels 10 are carried by the intermediate portion of the yoke 7 and are located directly in advance of the flanges 6. The link or links 9 are so disposed that the yoke 7 may have slight vertical swing while the lever 8 remains in a stationary or fixed position. This is due to the fact that the yoke is pivoted to the shaft 4 while the lever 8 is fulcrumed upon the frame 1 in advance of the intermediate portion of the said yoke.

The operation of the implement is as follows: When it is being drawn along the lever 8 is swung so that the intermediate portion of the yoke 7 is lowered whereby the shovels 10 engage the ground and open furrows therein. The flanges 6 of the rollers 5 follow along in the said furrows and the said flanges and rollers pulverize, pack and smooth the soil within the furrows and at the sides of the same and at the surface of the soil between the furrows. Thus it will be seen that a series of parallel ditches are formed and that the soil is effectually pulverized and packed about the same. As above intimated such ditches are desirable for irrigation purposes as by their use water is economized as in comparison with the system of flooding. By reason of the fact that the intermediate portion of the yoke 7 and the shovels carried thereby may have slight vertical movement while the lever 8 remains in fixed position it is possible for the said implement to pass over uneven places in the surface of the soil without forcing the said shovels to cut too deep or too shallow in the soil as the said yoke may within a limited degree so ride as to accommodate itself to the surface of the soil and the shovels will be carried accordingly.

Having described my invention what I claim as new and desire to secure by Letters Patent is:

An implement as described comprising a frame provided with a draft yoke, a roller journaled in said yoke to rotate about the axis and having peripheral flanges, a second yoke pivoted for movement about the axis of the roller and lying in advance thereof and within said draft yoke, shovels attached to the second yoke located in advance of the flanges of the rollers, a lever fulcrumed upon the frame in advance of the second yoke, a latch bar carried by said lever, a quadrant held in the path of said latch bar adapted to be engaged thereby, links connecting said lever with said yoke arranged to limit the downward motion of said shovels and permit slight upward motion thereof.

In testimony that I claim the foregoing as my own, I have hereto affixed my signature in the presence of two witnesses.

HANS ERICKSON.

Witnesses:
WILLIAM A. CARTER,
MAURICE GROSHON.